(12) United States Patent
van Buitenen et al.

(10) Patent No.: US 7,468,151 B2
(45) Date of Patent: Dec. 23, 2008

(54) METHOD FOR THE PREPARATION OF PURIFIED MICROPARTICLES

(75) Inventors: Adrianus Franciscus G. van Buitenen, Haarlem (NL); Rudolf Verrijk, Noordwijk (NL)

(73) Assignee: Octoplus Sciences B.V., Leiden (NL)

( * ) Notice: Subject to any disclaimer, the term of this patent is extended or adjusted under 35 U.S.C. 154(b) by 730 days.

(21) Appl. No.: 10/493,906

(22) PCT Filed: Oct. 23, 2002

(86) PCT No.: PCT/NL02/00672

§ 371 (c)(1),
(2), (4) Date: Oct. 27, 2004

(87) PCT Pub. No.: WO03/035244

PCT Pub. Date: May 1, 2003

(65) Prior Publication Data

US 2005/0084536 A1   Apr. 21, 2005

(30) Foreign Application Priority Data

Oct. 26, 2001   (EP) ................................ 01204096

(51) Int. Cl.
*B29B 9/00* (2006.01)
*A61K 9/14* (2006.01)
(52) U.S. Cl. ................ 264/5; 425/6; 424/489
(58) Field of Classification Search ........................ None
See application file for complete search history.

(56) References Cited

U.S. PATENT DOCUMENTS

| | | | |
|---|---|---|---|
| 4,652,441 A | 3/1987 | Okada et al. ................ 424/497 |
| 5,049,392 A | 9/1991 | Weiner et al. ............... 424/450 |
| 5,069,936 A | 12/1991 | Yen ........................ 427/213.33 |
| 5,100,591 A | 3/1992 | Leclef et al. ................. 264/4.6 |
| 5,945,126 A * | 8/1999 | Thanoo et al. .............. 424/489 |
| 5,947,689 A | 9/1999 | Schick ........................ 417/19 |
| 5,948,441 A | 9/1999 | Lenk et al. .................. 424/489 |
| 5,962,566 A | 10/1999 | Grandfils et al. ............ 524/378 |
| 6,264,988 B1 | 7/2001 | Yen ............................. 424/490 |
| 6,270,802 B1 | 8/2001 | Thanoo et al. |

(Continued)

FOREIGN PATENT DOCUMENTS

EP   0 752 245   8/1997

(Continued)

OTHER PUBLICATIONS

Encyclopedia of Controlled Drug Delivery, vol. 1, "Liposomes," Ed. by E. Mathiowitz, Wiley-Interscience (1999).

(Continued)

*Primary Examiner*—Mary Lynn F Theisen
(74) *Attorney, Agent, or Firm*—Morrison & Foerster LLP

(57) ABSTRACT

The present invention is directed to a method for purifying microparticles. These microparticles are prepared in a liquid medium and are recovered free from impurities and undesirable reaction products in a particular way. In addition, an apparatus has been claimed to carry out the method of the invention. Since the microparticles are essentially intended to carry drugs or other biologically active compounds, the entire process can be carried out aseptically.

46 Claims, 3 Drawing Sheets

U.S. PATENT DOCUMENTS 6,303,148 B1  10/2001  Hennink et al. ............. 424/489
2001/0038823 A1  11/2001  Rossling et al. ............. 424/497

FOREIGN PATENT DOCUMENTS

| JP | 56 133302 | 10/1981 |
| WO | WO98/00170 | 1/1998 |
| WO | WO98/22093 | 5/1998 |
| WO | WO01/68235 | 9/2001 |

OTHER PUBLICATIONS

Encyclopedia of Controlled Drug Delivery, vol. 2, "Microencapsulation", Ed. by E. Mathiowitz, Wiley-Interscience (1999).

* cited by examiner

METHOD FOR THE PREPARATION OF PURIFIED MICROPARTICLES

CROSS REFERENCE TO RELATED APPLICATIONS

This application is the national phase of PCT application PCT/NL02/00672 having an international filing date of Oct. 23, 2002, which claims priority from European application 01204096.0, filed Oct. 26, 2001. The contents of these documents are incorporated herein by reference.

FIELD OF THE INVENTION

The present invention relates to microparticles, and more particularly to methods for preparing microparticles. More specifically, the invention relates to methods, devices, apparatuses, processes, and processing lines for preparing and purifying microparticles that are useful as drug carriers in the prevention, diagnosis and therapy of diseases.

BACKGROUND

Microparticles have been studied extensively by the pharmaceutical industry, drug delivery companies and academic research groups for more than three decades now with significant success. It has been shown that microparticles are very useful carriers for active compounds in the broadest sense. They can be loaded with drugs, diagnostic agents, vaccines, or genetic material and administered to deliver these active materials to an organism or to specific cells or tissues, optionally providing controlled release or specific binding to targeted structures. In some applications, microparticles have proven useful even when they do not contain active compounds, e.g. in the controlled embolization of blood vessels. As diagnostic carriers or as transfection systems, they may not have to be administered to e.g. a plant, an animal or to a human organism, but can be used in vitro to produce the desired effects.

Microparticles have been defined and classified in various different ways depending on their specific structure, size, or composition. As used herein, microparticles are broadly defined as micro- or nanoscale particles which are typically composed of solid or semi-solid materials and which are capable of carrying an active compound. Typically, the weight-average diameter of such microparticles ranges from approximately 10 nm and approximately 500 µm. More preferably, the average particle diameter is between about 50 nm and 100 µm. Several types of microparticle structures can be prepared according to the invention. These include substantially homogenous structures, such as nano- and microspheres, nano- and microparticles, solid lipid nanoparticles, and the like. They also include particles with a structure comprising an inner core and an outer coating, such as nano- and microcapsules. They further include particles formed by the colloidal association of small molecules, especially of amphiphilic molecules, or other complex structures, such as liposomes, lipoplexes, lipid complexes, and lipospheres.

Microparticles are capable of carrying one or more active compounds. For instance, an active compound may be more or less homogeneously dispersed within the microparticles or within the microparticle cores. Alternatively, it may be located within the microparticle shell or coating. In complex particles, such as liposomes or lipospheres, the active compound may be associated with certain hydrophilic or lipophilic regions formed by the associated amphiphilic molecules contained in such particles, depending on the hydrophilicity or lipophilicity of the compound.

Pharmaceutical products with drug-containing microparticles have been developed which improve certain therapies with injectable drugs. For instance, parenteral depot formulations based on microparticles are appreciated by patients and health care providers as they allow a drug to be administered at a greatly reduced dosing frequency, such as once a month instead of daily. An example for a successful product line based on this concept is Lupron® depot, containing the drug leuprolide, which is released over a period of 1 to 4 months depending on the specific product and formulation. In this product, the microparticles are primarily composed of biodegradable polymers. Other examples for the successfully commercialized applications of microparticles are the products AmBisome®, DaunoXome®, Doxil®, Amphotec®, and Abelcet®, which are based on liposomes or similar lipid-based microparticulate structures or complexes.

Several methods for the preparation of microparticles have been described, the majority of which involve the formation of the particles in a fluid or liquid carrier. For instance, polymeric microparticles may be formed by chemical, physico-chemical or physical processes involving interfacial polymerization, dispersed-phase crosslinking, complex coacervation, coacervation, thermal denaturation, salting-out, solvent evaporation, hot-melt techniques, solvent removal, solvent extraction, or phase separation. A good description and summary of many of the microparticle formation processes used today is found in the Encyclopedia of Controlled Drug Delivery, ed. by E. Mathiowitz, Wiley-Interscience, vol. 2, article "Microencapsulation", which is incorporated herein by reference to describe suitable microparticle preparation processes.

Typically, lipid-based microparticulate systems such as liposomes are formed in liquids, most often in aqueous liquids. Among the principal processes used for their preparation are lipid film hydration, dehydration-rehydration, reversed-phase evaporation, organic solution injection, and detergent removal. Very often, the crude structures thus obtained are further processed to adjust the particle size or to increase the load of active compound. Such processes may include membrane extrusion, high pressure homogenization, treatment with ultrasound, dehydration-rehydration, freeze-thaw cycles and the like. The most common methods to prepare liposomes and other lipid-based micro- and nano-structures are reviewed in the Encyclopedia of Controlled Drug Delivery, ed. by E. Mathiowitz, Wiley-Interscience, vol. 1, article "Liposomes", which is incorporated herein by reference to describe suitable microparticle preparation processes.

Considering the wealth of information available on methods for the preparation of microparticles, comparatively little attention has been paid to any processing steps following the formation of the particles which are nevertheless needed to obtain a product which is suitable and acceptable for pharmaceutical and diagnostic uses. In particular, the purification aspect has not been solved in a satisfactory way in many of the known preparation methods.

The purification of the particles after their formation is important for a number of reasons. For instance, a more or less significant amount of free active compound may be present in the liquid in which the microparticles were formed, as most preparation methods lead to loading rates of clearly less than 100%. Unbound or unincorporated active compound is mostly undesired because it behaves differently from incorporated material in terms of pharmacokinetics, toxicity, effectiveness, or stability. It is therefore highly desirable to remove unbound active material from the microparticle dispersion prior to its use. The same is true for other substances, which may include unincorporated fractions of microparticle components or excipients, but also substances which were needed in the process of microparticle formation only, or which were produced during that process. Examples for such impurities whose removal from the microparticle dispersion may be desired include crosslinking reagents, initiators, reaction product, degradation products, stabilizers, surfactants, detergents, thickeners, solvents, cosolvents, substances for adjusting the pH, osmotic pressure, ionic strength, or zeta potential, etc. In a further aspect, it may be useful to remove microparticles that are outside the desired size range of the particles, as very small or very large microparticles—relative to the target diameter for a specific application—may behave quite differently from proper sized particles.

In the prior art, a few methods have been described to separate undesired substances or particles from microparticles in dispersions. For instance, microparticles may simply be washed on a filter with a washing liquid. Such a method is e.g. described in U.S. Pat. No. 4,652,441, which is incorporated herein by reference. Another known option is centrifugation, which is used to obtain a concentrated microparticle "pellet" and a supernatant which is subsequently removed by decantation. Typically, the process is repeated several times to obtain an acceptable level of purity. Centrifugation, however, has several disadvantages. First, it exerts some substantial mechanical force on the microparticles, which may damage their structure or lead to the formation of aggregates that cannot easily be dispersed again. If the microparticles are liposomes, centrifugation may prove destructive altogether. On the other hand, if the microparticles are very small, i.e. in the submicron range, or even below about 200 nm in diameter, high rotation speeds have to be applied in order to achieve particle sedimentation, making this process costly, energy-consuming, and not very efficient. It is also difficult to set up centrifugation as a continuous or semi-continuous process, or to scale it up to industrial throughput requirements.

These concerns are especially valid when the purification of microparticles must be conducted under aseptic conditions. This is often the case since one of the preferred uses of microparticles is in the parenteral administration of active compounds. Any product for parenteral use must be sterile, and while many conventional injectables can be sterilized after their preparation, this is not often an option for microparticle formulations. Injectable solutions are most often sterilized in their vials by autoclaving. Sometimes it is also possible to sterilize the final product by gamma- or e-beam radiation.

If these sterilization methods cannot be used due to the insufficient stability of the formulation, the solution may be filtrated to remove any microbial contaminants and subsequently filled into the vials under aseptic conditions. However, bacteria cannot reliably be separated from microparticles unless the particles are very small, such as smaller than 0.2 µm in diameter. Many types of microparticles are larger than this. Furthermore, microparticles are often loaded with highly sensitive compounds, such as peptides, proteins, or nucleic acids, which are not stable enough to allow heat sterilization.

Partly in response to some of the needs mentioned above, it has been suggested to purify microparticles by methods involving filtration or dialysis, which are comparatively gentle methods. For instance, U.S. Pat. No. 5,069,936 discloses the preparation of protein microspheres with subsequent purification by centrifugation and washing, gradient centrifugation, but also by dialysis, gel-filtration, electrophoresis, column chromatography, thin-layer chromatography, hollow-fiber ultrafiltration, and tangential flow filtration. According to U.S. Pat. Nos. 5,962,566, 5,100,591, 5,069,936, and 5,947,689, microparticles of various types can be purified by tangential ultrafiltration or diafiltration. However, they do not teach how this method can be carried out aseptically at a large manufacturing scale. Some more advanced solutions to these problems are disclosed in U.S. Pat. No. 6,264,988, even though this document addresses a very specific and rather complicated process for the manufacture of fibrinogen-coated cross-linked albumin microparticles. There still remains the need for improved methods to prepare purified microparticles, i.e. for methods which are efficient, easily scalable to large batch volumes, allow a high degree of continuous processing, are easily conducted under aseptic conditions, and allow the gentle processing of highly sensitive and instable materials. There also is a need for improved apparatuses, processing lines and assemblies which can be used for conducting such methods.

It is therefore an object of the invention to provide an improved method for preparing microparticles. More particularly, an object is to provide an aseptic method for the preparation of purified, drug-loaded microparticles. In another aspect, it is an object of the invention to provide a method for the preparation of purified, drug-loaded microparticles which is easy to scale-up to large production volumes. Furthermore, it is an object of the invention to provide a method which allows a high degree of continuous processing. In a further aspect, it is an object of the invention to provide apparatuses and assemblies of processing equipment which can be used to prepare and purify microparticles. Yet in another aspect, it is an object to provide purified microparticles obtained by the method of the invention, and pharmaceutical compositions comprising such microparticles.

SUMMARY OF THE INVENTION

According to the invention, purified microparticles are prepared by the method for the preparation of purified microparticles, comprising the steps of:

(a) providing a liquid medium containing a dispersed precursor material which is capable of forming microparticles;

(b) forming microparticles from the precursor material;

(c) purifying the microparticles formed in step (b) by filtration in closed circuit processing under aseptic conditions, such that the microparticles are retained in a retentate.

Particularly, the method comprises the steps of (a) providing a liquid medium containing a precursor material which is capable of forming microparticles; (b) forming microparticles from the precursor material in the liquid medium to obtain a microparticle dispersion; (c) treating the microparticle dispersion formed in step (b) by filtration and particularly by tangential flow filtration using a filter to obtain a filtrate and a retentate, wherein the filter is selected to retain the microparticles in the retentate; (d) collecting the retentate; wherein steps (b) and (c) are conducted under aseptic conditions within the same closed apparatus from which the microparticle dispersion obtained in step (b) is not removed before conducting step (c). Selecting tangential flow filtration as a preferred purification step and conducting it within the same processing line in which also the microparticle formation takes place allows the effective implementation of aseptic conditions.

The method is easily scaled up to large batch volumes, and permits a relatively high degree of continuous processing. For instance, the purification step can be easily repeated through continuously recirculating the microparticle dispersion by means of a closed circuit assembly which comprises at least one pump and the filtration unit. When the desired degree of purity is achieved, the microparticle dispersion can be collected or further processed. The method can, in principle, be applied to prepare purified microparticles of various different types and sizes, such as microspheres, microcapsules, liposomes, lipoplexes, lipid complexes, lipospheres, cochleates, nanoparticles, nanospheres, and nanocapsules. It is useful to prepare microparticles in the size range from about 10 nm to about 500 µm, and particularly for particles with diameters of about 50 nm to about 100 µm. Some specific applications of microparticles require diameters of about 100 nm to about 50 µm, which is also a preferred range according to the present invention. As used herein, the size or diameter refers to their weight-average diameter.

The invention also provides a device or apparatus in which the method can be carried out conveniently. Thus, the invention also relates to a device for the preparation and purification of microparticles, said device comprising one of a plurality of processing units, said processing unit comprising a processing loop including:
(a) a loop inlet
(a) a processing vessel with an agitator,
(b) a pump; and
(c) a tangential flow filter having an inlet and a retentate outlet arranged in the loop and a filtrate outlet forming an outlet for the loop,
and in which device the plurality of processing units are arranged in cascade, such that the outlet of an upsteam processing unit is connected to the inlet of a subsequent downsteam processing unit, or in which for one processing unit the filtrate outlet is connected to the loop inlet. Particularly, the device comprises processing units and a conduit system, wherein the processing units are capable of processing a liquid and comprise (a) a vessel having an interior chamber, an inlet and an outlet, the vessel being equipped with a stirring tool; (b) a pump having an inlet and an outlet; (c) a filtration unit capable of tangential flow filtration, the filtration unit having an inlet, a filtration outlet and a retentate outlet; and optionally (d) one or more further units; wherein the conduit system connects the processing units, and wherein the pump and the filtration unit are members of a closed loop in which the units receive liquid through inlets, and in which the units emit liquid through outlets, and wherein the outlet through which the tangential flow filtration unit emits liquid to another unit is a retentate outlet. The apparatus easily allows operation under aseptic conditions, makes provision for scaling the method up to large volumes, and allows a significant degree of continuous processing.

DETAILED DESCRIPTION OF THE INVENTION

The method of the invention comprises a step of providing a liquid containing a dispersed precursor material which is capable of forming microparticles. The precursor material represents the material from which the microparticles will subsequently be formed by one or more physical or chemical processes. More typically, the precursor material comprises one or more components that are solid or semi-solid in their pure state, such as polymers or lipoidal substances. In some other cases, the components may be liquid and are only later, i.e. during the formation of the microspheres, turned into solids, e.g. by crosslinking.

Depending on the desired type of microparticles, precursor materials from various different chemical categories can be used. Preferred precursor materials comprise one or more pharmaceutically acceptable polymers. Polymers which are capable of forming microspheres include polyanhydrides, polyesters, polylactide, polyglycolide, poly(lactide-co-glycolide), poly(caprolactone), poly(amino acids), poly(phosphoesters), poly(orthoesters), polyamides, polysaccharides, natural or synthetic gums, alginates, gelatin, albumin, collagen, chitosan, starch, starch derivatives, cellulose esters, cellulose ethers, polyurethanes, polycarbonates, poly(iminocarbonates), poly(phosphazenes), poly(ethylene terephthalate), polyvinyl alcohol, polyethers, polyethylene glycol, polyethylene oxide, polypropylene glycol.

Especially preferred as a component of the precursor material is a dextran or a dextran derivative, such as a dextran derivative having side chains with polymerizable or crosslinkable groups. Examples of such dextran derivatives are dex-HEMA (dextran with hydroxyethyl methacrylate side chains), dex-MA (methacrylated dextran), dex-lactate-HEMA, dex-glycolide-HEMA, and dex-lactate/glycolide-HEMA. These dextran derivatives are particularly useful for several reasons. For instance, upon polymerization of their hydroxyethyl methacrylic groups they form three-dimensional crosslinked polymer networks. These polymer networks form hydrogels which are useful drug carriers as they allow the diffusional release of active compounds through their water-filled pores and channels; alternatively, the release of active compounds from such hydrogels may be controlled by the degradation—in particular by the non-enzymatic hydrolysis—of the polymer networks. Dextran-based hydrogels are disclosed in more detail in WO 98/00170, which is incorporated herein by reference for the description of these preferred dextran-based hydrogels.

In another preferred embodiment, the precursor material comprises one or more lipoidal substances. For instance, if the method of the invention is used to make lipid nanospheres, liposomes, lipid complexes, liposphere, cochleates, lipoplexes, or other lipid-based or lipid-containing microparticles, the precursor material will contain such lipoidal components. As used herein, lipoidal substances are lipids and lipid-like structures, usually—but not always—with a high degree of lipophilicity. Lipoidal substances are typically solid or semi-solid and include natural, synthetic or semi-synthetic fats, hydrated fatty oils, waxes, phospholipids, sterols, steroids, ceramides, and the like. In some cases, only one lipoidal component is used. In other cases, such as when the microparticles comprise lipid membrane structures, it will be necessary for the precursor material to contain two or more lipoidal substances from the same or different chemical classes.

The precursor material may also contain additional excipients, such as surfactants, fillers, stabilizers, lyoprotectants, antioxidants, permeation enhancers, or any other pharmaceutically acceptable substances which may be needed or useful in the formation or composition of microparticles.

The precursor material is contained in a liquid. This may mean the precursor material is dissolved in a liquid carrier. In view of some common processes of microparticle formation to which the invention can be applied, it may be desirable to provide a liquid that contains the precursor material within a dispersed phase, such as a dispersed solid phase or a dispersed liquid phase. The liquid can therefore represent a suspension, an emulsion, or a suspension-emulsion.

In one of the preferred embodiments, the precursor material is incorporated in the liquid carrier in the form of an emulsion. This typically means that, in addition to the liquid carrier, another auxiliary liquid phase is provided in which the solid and semi-solid components of the precursor material is suspended or dissolved. This liquid suspension or solution forms the inner phase of an emulsion whose outer liquid phase is the liquid carrier. Alternatively, the precursor material may itself comprise a liquid component which may form the dispersed inner phase of an emulsion.

If the dispersion of the precursor material in the liquid carrier is provided in the form of an emulsion, the outer or continuous phase of the emulsion is preferably a hydrophilic phase, such as an aqueous phase. Thus, the preferred emulsion types are o/w-, w/o/w- and w/w-emulsions. Emulsions without organic solvents are preferred for economical, ecological, and/or safety reasons; however, not in all cases it is possible to avoid the use of such solvents. The usefulness of such emulsions having a hydrophilic continuous phase has been described for many processes of microparticle formation, such as in WO 98/22093, which is incorporated herein by reference.

Emulsions, like suspensions, may be formed from one or more liquid carrier phases and the precursor material by known methods beforehand, so that in step (a) they are already provided as such. Alternatively, the raw materials can be provided and then processed to form an emulsion or suspension, which may be considered as a separate or additional step. It may also be necessary to include a homogenization step after an emulsion or suspension is provided or formed and before the formation of the microparticles is carried out to ensure a high level of homogeneity, which will also have a positive effect on the homogeneity of the microspheres later on.

The liquid may contain further dissolved or dispersed ingredients which may not be needed in the microparticle composition, but as substances which are useful to carry out the method or the processes involved in the method. Thus, the liquid may comprise e.g. one or more mineral salts, organic salts, sugars, sugar alcohols, acids, bases, amino acids, polymers, pigments, colorants, buffers, solvents, cosolvents, lyoprotectants, surfactants, thickeners, lipids, stabilizers, antioxidants, preservatives, and the like.

Furthermore, the liquid may comprise an active compound. Basically, microparticles can be loaded with an active compound during their preparation or thereafter. According to the invention, it is preferred that an active compound is incorporated during the formation of the particles, even though this cannot be applied to all cases: Some active compound may not be stable enough for this purpose, while for others it may be desirable to specifically load them onto the microparticles' surface.

The active compound is preferably a drug or a diagnostic agent. In general, the incorporation into microparticles and the administration of such microparticles may be useful for any type of drug. However, the method of the invention seems particularly useful for drugs with an elimination half life of less than about 24 hours, particularly of less than 6 hours or even less than 2 hours. In another aspect, it is useful for drugs which have a low bioavailability using administration routes other than parenteral administration, e.g. oral, transmucosal, buccal, pulmonary, nasal, or transdermal administration. As used herein, a low bioavailability is a bioavailability of 10% in comparison to an intravenous administration, preferably of less than 5%. Particularly preferred is the method for drugs which do not achieve a bioavailability of more than about 2 to 3% when administered by noninvasive routes of administration. This is very often the case with active compounds that represent large molecules, such as peptides, modified peptides, proteins, hormones, antigens, polysaccharides, nucleic acids, extremely hydrophilic compounds (e.g. some bisphosphonates, such as ibandronate; ammonium salts, such as suxamethonium chloride; multivalent salts, such as EDTA), highly insoluble substances, or highly acid-labile compounds (such as benzyl penicillin). A large group of compounds to which the method can be applied advantageously is that of peptides, proteins, modified peptides or functional analogues thereof. Typically, these compounds are too large to be bioavailable after noninvasive administration, or they may be unstable. Biotechnology and modern drug discovery techniques present an increasing number of such new drug compounds to the pharmaceutical industry. Particularly preferred compounds according to the invention comprise peptidic bonds and have a molecular weight of more than 1,000, and especially of more than 5,000. Examples of preferred compounds from this category are insulin, epoetin-alfa, epoetin-beta, calcitonin, heparin, IFN(interferon)-alfa-2a, IFN-alfa-2b, PEG-IFN-alfa, IFN-alfacon-1, IFN-beta, IFN-beta-1a, IFN-beta-1a, IFN-beta-1b, IFN-gamma-1b, somatropin, follitropin, menotropin, leuprolide, goserelin, buserelin, triptorelin, filgrastim (G-CSF), lenograstim (G-CSF), sargrarmostim (GM-CSF), PEG-G-CSF, blood clotting factors such as factor VIII and factor IX, nadroparin, dalteparin, tinzaparin, certoparin, reviparin, tirofiban, abciximab, octreotide. Examples of preferred active compound from other categories are paclitaxel, cisplatin, carboplatin, fluphenazine, doxycyclin, estradiol, prasteron, testosterone, medroxyprogesterone, cytarabin, cyproterone, nandrolone, formestan, and metenolon. It may also be desirable to incorporate a combination of more than one active compound into microparticles with the method of the invention, such as medroxyprogesterone and estradiol.

In a step according to the method of the invention, the microparticles are formed from the precursor material in the liquid medium to obtain a microparticle dispersion. As mentioned above, a number of different ways have been described to actually carry out the step of microparticle formation. For instance, polymeric microparticles may be formed by chemical, physicochemical or physical processes involving interfacial polymerization, dispersed-phase crosslinking, complex coacervation, coacervation, thermal denaturation, salting-out, solvent evaporation, hot-melt techniques, solvent removal, solvent extraction, or phase separation. In one of the preferred embodiments, the method is used with microparticle formation processes involving the physical solidification of the precursor material by precipitation, complexation, phase separation, coacervation, complex coacervation, salting-out, solvent evaporation, solvent removal, solvent extraction, or congealing. In another preferred embodiment, the microparticles are formed chemically involving a crosslinking or polymerization step. For instance, radical polymerization can be employed to polymerize or crosslink hydrophilic polymers having double bonds, such as dextrans modified with acrylic groups like HEMA, to form three-dimensional polymeric networks or hydrogels. In order to carry out this step, a radical polymerization initiator may have to be added to the liquid, such as 2,2-dimethyl-2-phenyl acetophenone, 2-methoxy-2-phenyl acetophenone, water-soluble azo-compounds, benzoyl peroxide, potassiom persulfate or ammonium persulfate. TEMED is frequently used to accelerate the process. A procedure to form microparticles is described in WO 98/22093.

Whichever concept of microparticle formation is followed in step (b), it will be useful to carry out this step under effective agitation in order to ensure the even distribution of e.g. reagents or applied heat and thereby the homogeneity of the microparticles. It is also preferred that this step takes place under an atmosphere of reduced oxygen. In fact, this may apply to all other steps of the method as well, and it may be useful to replace the air within the whole apparatus, or at least within the closed or sealed parts of it, by nitrogen or by a noble gas to prevent undesired side reactions and the degradation of active compounds or excipients. To maintain aseptic conditions, the nitrogen or noble gas can be filtered with an appropriate filter.

After the microparticles are formed, another crucial step is their purification, which is carried out as a filtration step and particularly using tangential flow filtration. However, before the microparticle dispersion is purified, it may in some cases be necessary to carry out one or more additional steps. For instance, it may me useful to homogenize the particles. This is typically done by exerting shear forces on the dispersion. A preferred method for homogenizing the particles is high pressure homogenization, which is very often applied to liposomes or other lipid-based microparticles to adjust the particle diameter to some more narrowly defined limits. However, other types of soft microparticles may also be homogenized.

The filtration step itself serves the purpose of separating the microparticles in dispersion from any impurities or other substances that are undesired in the final product. Impurities, for example, may be any substances that entered the microparticle dispersion as impurities contained in raw materials, or degradation products that were produced during the step of microparticle formation. Other substances that need to be removed include those materials that were needed in a previous process step, but which are undesired in the product. Examples for such substances are, as said, crosslinking reagents, initiators, reaction product, degradation products, stabilizers, surfactants, detergents, thickeners, solvents, cosolvents, substances for adjusting the pH, osmotic pressure, ionic strength, or zeta potential, etc. If an active compound was present in the liquid containing the precursor material to be incorporated into the microparticles during their formation in step (b), the filtration step also serves to remove any unbound or unincorporated active compound from the dispersion. Another desirable effect that may need to be achieved during the purification step is the sizing of the microparticles, which in this case means that particles that are smaller than the desired size are removed by filtration.

It is an important feature of the invention that the particle formation step (b) and the purification step (c) are conducted consecutively in one apparatus, i.e. the microparticles dispersion is not collected or removed from the apparatus, but transferred through a closed conduit system of the apparatus to the filtration unit where the purification takes place, allowing and ensuring that the combined steps are carried out under aseptic conditions. Performing the steps (b) and (c) consecutively means that the microparticle dispersion is not removed or stored, but that it is directly transferred to the filtration unit. This does not exclude the possibility that there will be a time lag between the two steps. For instance, the particle dispersion may remain in the vessel in which the microparticles were formed until purification is performed. However, since the method does not allow the removal of the dispersion before filtration, it inherently requires that the processing unit where particle formation takes place and the filtration unit or members of a communicating system herein defined as an apparatus. Communication between the units of the apparatus may be interruptible by valves which, for instance, may be used to direct the microparticle dispersion to the filtration unit at a selected point of time, which may be immediately after microparticle formation, but also at a later point of time. In any case, the microparticle dispersion does not leave the communicating interior space of the processing line, which space represents an aseptically sealed environment.

Tangential flow filtration is particularly useful for purifying microparticles under aseptic conditions and in continuous or semi-continuous processes. As used herein, the term "filtration" refers to any method of separating solid materials from liquids, or of separating solids suspended in liquids from other suspended solids with a different particle size, using a filter. In filtration, there may be a pressure gradient across the filter. Filtration without such pressure gradient is often referred to as dialysis, which is one of the modes in which filtration can be carried out according to the invention.

In contrast to other filtration techniques, such as single-pass, direct flow, normal flow, or dead-end filtration, it is a feature of tangential flow filtration (TFF) that liquid to be filtered is pumped tangentially along the surface of the filter. Another common term for TFF is crossflow filtration. FIGS. 1 and 2 illustrate the difference of flow. direction between TFF (FIG. 2) and normal flow filtration (NFF; FIG. 1). It also illustrates the use of the terms "filtrate" and "retentate" (vide infra). The filtrate is the portion of the fluid that has passed through, i.e. permeated, the filter. Therefore, the filtrate is also sometimes called permeate. The filtrate may contain small solid particles, depending on the pore size of the filter that is used. The retentate is the portion of the fluid that does not permeate the filter, but is retained by it. The production of a retentate is typical for TFF, but not for other filtration techniques. In TFF, the retentate is often recirculated to the filter. Sometimes the retentate is called concentrate. In diafiltration, additional liquid, typically of a different composition, is added to the retentate before it is circulated. For example, diafiltration can be used to exchange the buffer system in which microparticles are suspended.

Various types of filters may be used in TFF. Apart from their cutoff range, filters may be classified by their composition and structure. Very often, porous membranes are used for TFF filters. High filtration efficiency is achieved with filters that are arranged as multiple hollow fibers, for which reason these filters are preferred for carrying out the invention.

Depending on the type and cutoff range of the filter that is used in TFF, the filtration can be classified as microfiltration (approximate cutoff range: 0.05 µm-1 µm), ultrafiltration (1 kD-1000 kD), high-performance filtration (10 kD-300 kD), nanofiltration or reverse osmosis (<1 kD). For the purpose of purifying microspheres and removing free drug and other dissolved or colloidal impurities, an appropriate filter and pore size is selected to retain the microparticles in the retentate, but to allow the free drug and the impurities to permeate the filter.

After selecting the pore size, the filter membrane surface area is selected to be appropriate for a specific batch size. This can be done by using the formula $A=V/J \times T$, wherein A is the membrane area in $m^2$, V is the permeated volume (filtrate volume) in liters, J is the filtrate flux rate in liters per $m^2$ and hour, and T is the time in hours. For carrying out the method of the invention, it is preferred that A is selected to yield a T in the range of about 0,1 hour to about 72 hours. Still more preferred is a T of about 0,1 hour to about 48 hours, or of about 0,2 hours to about 24 hours. Highly preferred is a T of less than 12 hours. These preferred limits should be applied to carrying out the method in general, while it may be necessary to define other limits when working with active compounds which are not very stable, especially in aqueous liquids, such as some peptides or proteins. In this case, it is preferred that A is preferably selected to yield a T of less than about 8 hours, and more preferably of less than about 5 hours or even less than 3 hours.

One of the key advantages of TFF is that it does not affect the microparticles in any undesirable way. The microparticles that are too large to pass through the filter do not build up on the filter surface as in NFF, but remain dispersed in the liquid to form the retentate. Thus, there is no danger of forming a cake of agglomerated microparticles which may not be easily predisposed. Also, the particles are not pressed against solid surfaces, which could alter their shape or lead to the release of incorporated active compound, especially in the case of liposomes or other lipid-based microparticles and microcapsules.

Another advantage of TFF is that it can be easily conducted under aseptic conditions. Filters are available in sterilizable, disposable cartridges, which are not only useful for avoiding microbial contamination, but also for avoiding cross-contamination between different batches prepared in the same apparatus at different times. After the preparation of a batch of purified microparticles, a cartridge can simply be disposed. The fact that the retentate does not have to be collected or removed and reintroduced to the apparatus—as is necessary for other filtration or separation processes including centrifugation—makes the likelihood of accidentally introducing contaminants rather small. Performing TFF as a continuous process step is also advantageous in terms of increasing process efficiency and effectiveness. It makes automation easy and thus contributes to cost control and a high level of reproducibility. While it may not be absolutely necessary to recirculate the retentate to the filter unit, the filtration efficiency can be increased substantially by doing so. According to the invention, it is preferred that the retentate is recirculated at least once, and more particularly at least 3 times.

Furthermore, it is an advantage of TFF that it can be easily scaled-up from small or experimental scales to large volume batch production. Filter materials, structures, and filtration path lengths can be retained during scale-up, allowing for the direct translation of conditions established during pilot-scale filtration to commercial-scale purification. It is even possible to use the same filtration unit to process very different batch sizes, as the size of the unit itself does not inherently limit the amount of fluid that it can filter.

The purified microspheres are obtained by collecting the retentate. Before this is done, it may be desirable to introduce one or more additional steps, depending on the requirements for the specific product. For instance, if an active compound cannot be incorporated into the microparticles during their formation, the microparticles are prepared without the compound according to steps (a) to (c) and thereafter loaded by contacting or incubating the microparticle dispersion, i.e. the retentate, with the active compound. This is also the method of choice when it is desired that the active compound is primarily associated with the surface of the microparticles instead of incorporated in their core or matrix. In this case, it may be useful to also add another purification step after loading the microparticles. Preferably, this second purification step is also carried out by TFF in the same manner as described above.

There may be instances in which a very narrow microparticle size distribution is desirable which calls not only for the removal of particles that are too small, but also requires the removal of very large particles. This can be carried out as an additional filtration step in which the filter type and pore size is selected to allow the desired microparticle fraction to pass into the filtrate. In this case, TFF can be used, but also NFF may be feasible.

If the microparticle dispersion, after being adjusted to the desired concentration which is normally achieved in the purification step (c) or in any subsequent step involving TFF, is sufficiently stable to have an acceptable shelf life, the retentate may simply be collected and filled into the final containers or packaging materials, such as vials, bottles, ampoules, syringes, plastic bottles and the like. Alternatively, the retentate may be collected and stored in sealed containers for further processing at a later point of time. Further processing may include mixing the retentate with additional excipients and/or active ingredients, sterilization, drying or freeze-drying.

In many cases, the active compound contained in the microparticle dispersion will not be stable enough to be stored in liquid for practical period of time. This is especially true for many peptides, proteins, polysaccharides, nucleic acids, or functional analogues of such compounds. In these cases it is preferred that the dispersion is dried or freeze-dried for storage soon after the last purification step. Preferably, the retentate containing the microparticles is freeze-dried.

In freeze-drying, which is also referred to as lyophilization, a liquid solution or dispersion is rapidly frozen. While the sample is still in the frozen state, the pressure is reduced to such an extent that the solvent sublimes, i.e. it passes directly from the solid to the vapor state and is thus removed from the sample. During sublimation, the temperature may be elevated again. Lyophilization yields highly porous solid foams or powders which are easily and rapidly dissolved or redispersed. The freeze-drying step can be conveniently carried out after filling portions of the microparticle dispersion into the final containers, such as vials. The filling and freeze-drying steps are preferably conducted under aseptic conditions. After freeze-drying, the final containers are sealed. If the product thus obtained is a pharmaceutical or diagnostic product, it may be useful to package it within a secondary package that also contains a vessel with the reconstitution liquid, so that the product is provided as a kit. In such a kit, the dry solid containing the microparticles which is obtained by freeze-drying and the reconstitution liquid are either accommodated in individually sealed compartments formed within the same primary container, such as in a two-chamber syringe, or they may be stored in sealed compartments which are part of separate vessels.

Purified microparticles can be prepared according to the method of the invention by practicing the steps disclosed above in a device which comprises processing units and a conduit system, wherein the processing units are capable of processing a liquid and comprise (a) a vessel having an interior chamber, an inlet and an outlet, the vessel being equipped with a stirring tool; (b) a pump having an inlet and an outlet; (c) a filtration unit capable of tangential flow filtration, the filtration unit having an inlet, a filtration outlet and a retentate outlet; and optionally (d) one or more further units, wherein the conduit system connects the processing units, and wherein the pump and the filtration unit are members of a closed loop in which the units receive liquid through inlets, and in which the units emit liquid through outlets, and wherein the outlet through which the tangential flow filtration unit emits liquid to another unit is a retentate outlet.

The device of the invention resembles an apparatus in a broad sense, comprising various processing units which are physically connected either directly or via a conduit system. The units have in common that they can be used to prepare purified microparticles according to the invention, each unit contributing to one or more of the steps involved. As discussed above, both the formation and the purification of microparticles takes place within a liquid phase. Therefore, the processing units are adapted to the processing of liquids, including liquid solutions, dispersions, emulsions, suspensions, and emulsion-suspensions. In addition to that, they may also have the capability to process solids or gases. As used herein, processing units are parts of the device and may themselves represent devices, apparatuses, tools and the like, which are connectable to other processing units and to a conduit system. Typically, a processing unit is used to change the physical or chemical characteristics of a material. Unless such a unit is directly connected to another unit, the processing units of the device are connected by tubes, pipes, channels, valves, fittings, and other items which can direct the flow of a liquid from one unit to another, which are herein collectively termed "conduit system".

The device or apparatus comprises a vessel which has an interior chamber, which is a space for holding material, in particular liquid material. The vessel has at least one inlet and one outlet, thus providing a means for materials to enter and exit the vessel. The vessel is further equipped with a stirring tool, which is also adapted to stir liquid materials and to mix it effectively with another liquid or to dissolve or disperse a solid within a liquid material. Such a vessel is useful for carrying out the step of forming microparticles as described above. Particularly when the microparticles are formed in a liquid two- or three-phase system, such as an emulsion, effective agitation is crucial for the quality of the product. Depending on the actual technique of particle formation, other vessel characteristics may also be important or useful. For instance, if the microparticles are formed chemically, it may be necessary to control the temperature within the reaction chamber, which can be done best if the vessel itself is thermostated. Preferably, it should also be adapted to withstand increased or decreased pressure. In order to be able to add liquid or solid materials, one or more additional inlets may be useful. To replace the air inside the vessel and, optionally, within the whole connectable inner space of the device which is not occupied by liquid material, and to perform the method in an oxygen-reduced atmosphere, the vessel may be equipped with an inlet for gas. However, the gas may also be introduced via an inlet located at another position within the device.

In order to be able to carry out the method under aseptic conditions, it is important that the vessel, as well as all other members of the apparatus which hold, receive, direct, or process any of the liquid material that is present during the process, are sealable towards the outside, i.e. to the air surrounding the device.

A wide variety of useful vessels is commercially available. Some of them are sold as reactors, others are called fermenters, depending on their primary application in research or industry. Apart from the equipment of the vessel as described above, its size is an important factor. To scale the method up from a pilot-scale to a large commercial scale it is primarily necessary to select a sufficiently large vessel to carry out the particle formation step. Because the method in its concept itself is highly suitable for large production volumes, the vessel preferably has an interior chamber with a volume of about 5 liters or more, and more preferably a volume of at least about 10 liters. In another preferred embodiment the chamber has a volume of at least about 20 liters.

The device further comprises a filtration unit capable of performing tangential flow filtration (TFF), whose principle was described above. In contrast to normal flow filtration units, a TFF unit has two outlets for liquid, one of them being a filtrate outlet for liquid material that has permeated the filter, the other one being a retentate outlet through which the portion of the liquid that is retained by the filter exits the unit. The filtration unit also has an inlet for the liquid substrate.

The invention also provides for a pump to be part of the apparatus or device. The pump is adapted to transport liquids, and it is used to feed the filtration unit with the microparticle dispersion after the step of microparticle formation has taken place. For this purpose, the pump may be positioned either in front of the filtration unit so that the microparticle dispersion first passes through the pump before it reaches the filtration unit, or the pump may be positioned behind the filtration unit so as to "pull" the dispersion through filtration unit. In order to be able to recirculate the retentate to the filtration unit, the pump and the unit are connected via the conduit system in such a way that a closed loop or circuit is formed. More specifically, the conduit system connects the pump and the TFF unit in such a way that the pump receives through its inlet the retentate emitted by the filtration unit through its retentate outlet. At the same time, the TFF unit receives through its inlet liquid that is emitted from the pump via the pumps outlet, which describes the minimal configuration of the closed loop processing line that is required for the device of the invention. This assembly allows the recirculation of the retentate, and thus ensures an effective separation or purification process. Valves may be operated to direct the microparticle dispersion into the closed loop initially, and to allow the purified dispersion to exit the loop.

Other processing units may also be members of this closed loop system. In a preferred embodiment, the vessel in which the step of particle formation is carried out is also integrated into the closed circuit assembly. This will allow larger volumes of liquid to be processed within the loop. If the vessel is thermostated, its integration will contribute to the control of processing conditions within the loop. Optional inlets and/or outlets in addition to those by which the vessel communicates with the other members of the loop may be used for adding substances, such as buffers, to more precisely control the purification process, to carry out diafiltration, or to take samples for in-process controls.

The device may further comprise one or more additional processing units which may or may not be part of the closed loop. For instance, a homogenizer may be positioned between the vessel and the filtration unit, which can be useful for treating the microparticle dispersion to achieve a narrow size distribution of the particles. Preferably, such a homogenizer is a high pressure homogenizer, which is especially useful in the preparation of liposomes and other lipid-based microparticles. Other units which may be useful include mixing units, heating units, cooling units, thermostats, pressurizing units, valves, pumps, vacuum pumps, filtration units, storage tanks, and control units.

Mixing units that are particularly useful for carrying out the method are static mixers. These mixers have the advantage that they have no moving parts. This produces lower capital and operational costs than for conventional mixers. They also do not exhibit the problems and disadvantages associated with the rotating seals of traditional agitators. Static mixers are operated in a pipeline. Liquid passes axially through a cylindrical mixing chamber containing obstacles, entering the unit through an inlet and exiting through an outlet. Within the mixing chamber, the flow follows a regime defined by the degree of turbulence that can be characterized by the dimensionless Reynolds number, which specifies the ratio of inertial forces to viscous forces. The mixing principle itself relies on radial momentum transfer, flow division and shear plane reversal. It is preferred that the device of the invention comprises one or more static mixers.

For carrying out the method described above to prepare microparticles for certain specific applications, it may be necessary to use an apparatus which comprises more than one closed loop assembly, wherein each closed loop comprises a filtration unit capable of TFF. For instance, it may be necessary to first prepare microparticles and thereafter load them with an—typically rather sensitive—active compound. If the microparticle formation involves a chemical process, it may be necessary to purify the particles before contacting them with the active compound. After loading, the microparticles may have to be purified again. Also, in the preparation of certain types of complex microparticles, such as polymeric microspheres which contain liposomes embedded within their polymeric matrix, more than one microencapsulation procedure has to be conducted, and a device having at least two closed loops may be more appropriate than an apparatus with only one closed circuit processing stream.

BRIEF DESCRIPTION OF THE DRAWINGS

The invention is further illustrated by the drawings.

Referring to FIG. 1, the principle of normal flow filtration (NFF) is that the forced flow direction (5) of a liquid to be filtered is perpendicular to the plane of the filter membrane (4). A typical NFF unit has a housing (1), an inlet (2) for the liquid to be filtered, and a filtrate outlet (3).

Referring to FIG. 2, the principle of tangential flow filtration (TFF) is that the liquid to be filtered is forced to move in a direction (5) which is tangential to the plane of the filter membrane (4). A typical TFF unit has a housing (1), an inlet (2) for the liquid to be filtered, a retentate outlet (31), and a filtrate outlet (32). The flow direction (6) of the filtrate may be different from the forced flow direction (5) of the liquid to be filtered.

FIG. 3 depicts a device for the preparation and purification of microparticles according to the invention. A vessel (1) having an interior chamber (2), which serves as a mixing and/or reaction chamber, is equipped with a stirring tool (5). The vessel (1) has an inlet (3) and an outlet (4) for liquid materials, and an additional inlet (18) through which it receives raw materials from a storage vessel (12) via a pump (15). Microparticle dispersions formed in the vessel (1) are conducted through the vessel's outlet (4) via a homogenizer (16) and a pump (6) having an inlet (7) and an outlet (8) to a filtration unit (9) capable of tangential flow filtration. The filtration unit (9) has an inlet (17), a filtrate outlet (10), and a retentate outlet (11). According to the invention, purified microparticles leave the filtration unit (9) through the retentate outlet (11). They can be recirculated to the vessel (1) which receives the retentate through its inlet (3). After a sufficient degree of purification, the retentate may be collected through a valve (14) into a storage vessel (13). Thus, the device of FIG. 3 comprises one closed processing loop in which the vessel (1), homogenizer (16), pump (6), and filtration unit (9) participate as major processing units.

FIG. 4 shows a device with 2 closed loop processing streams, with both closed loops comprising a tangential flow filtration unit (9, 19). In contrast to the device of FIG. 3, the retentate of the first filtration unit (9) can be further processed and combined with additional raw materials. For this purpose, the retentate outlet (11) of the first filtration unit (9) is connected via valves (14, 20, 21) and via a static mixer (22) to a second closed loop assembly comprising a pump (23) and the second tangential flow filtration unit (19) as principal processing units. Additional raw materials can be introduced into the processing line from a storage vessel (24) through one of the valves (20). The rententate of the second filtration unit (19), which contains microparticles, can be recirculated from the retentate outlet (25) of the unit via the pump (23) to the inlet (26) of the filtration unit (19). When a sufficient degree of purification has been reached, the microparticle dispersion can be collected via another valve (27) into another storage vessel (28). An additional tank (29) allows expansion and the processing of larger volumes of material.

Figure 1:
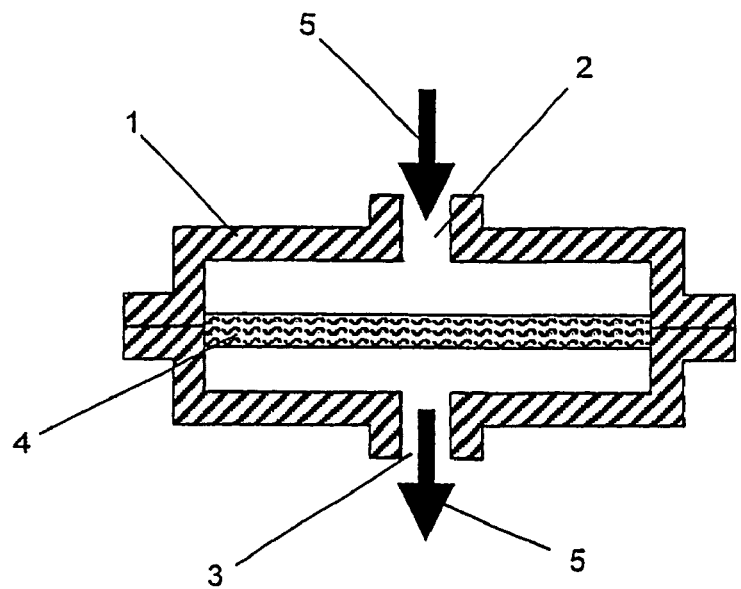
FIG. 1: Schematic representation of normal flow filtration (NFF).
Figure 2:
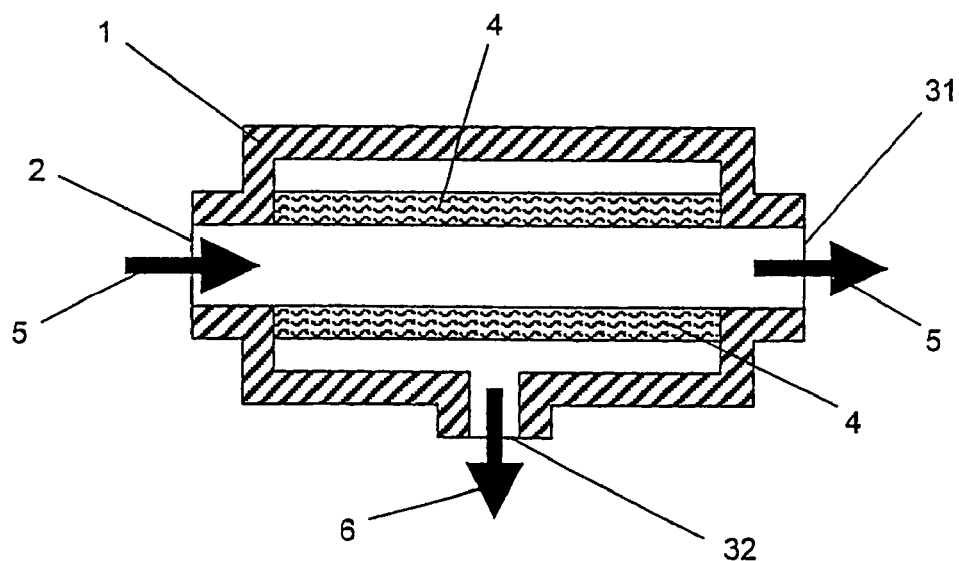
FIG. 2: Schematic representation of tangential flow filtration (TFF).
Figure 3:
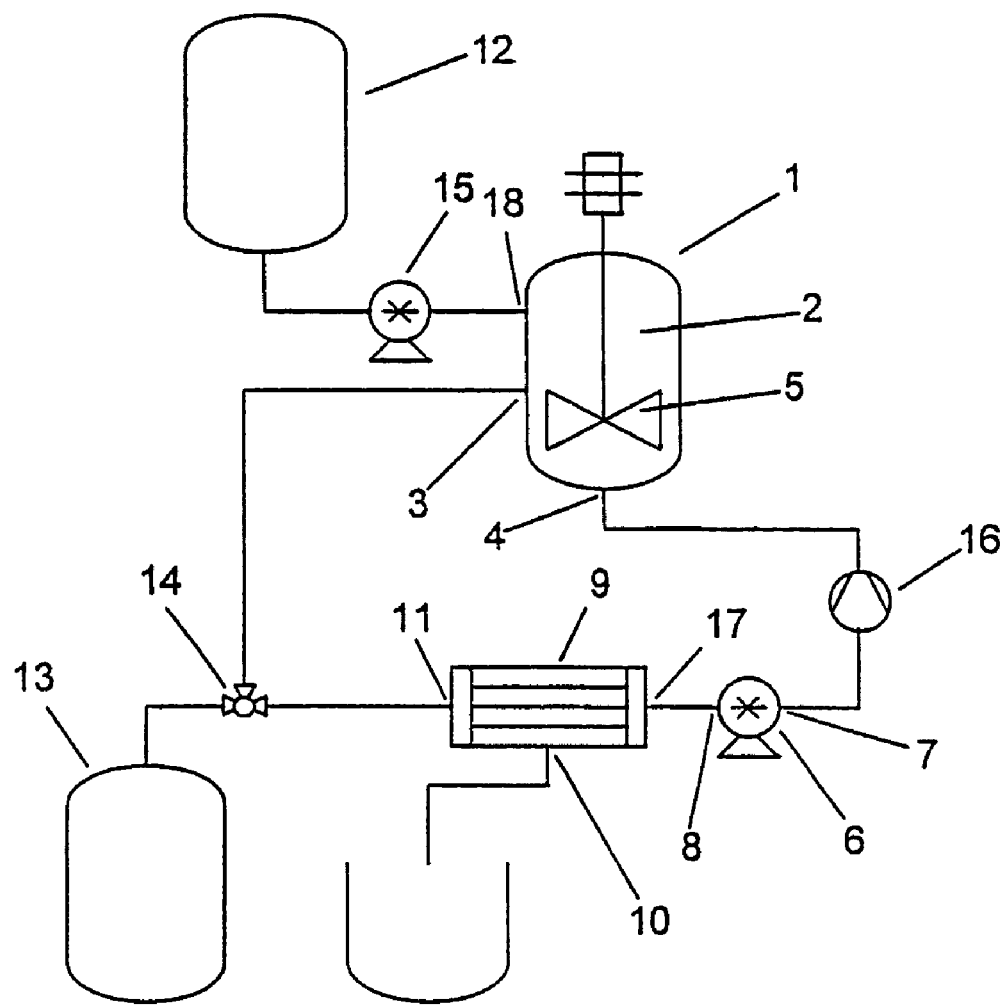
FIG. 3: Schematic representation of a device to prepare and purify microparticles comprising one closed loop assembly.
Figure 4:
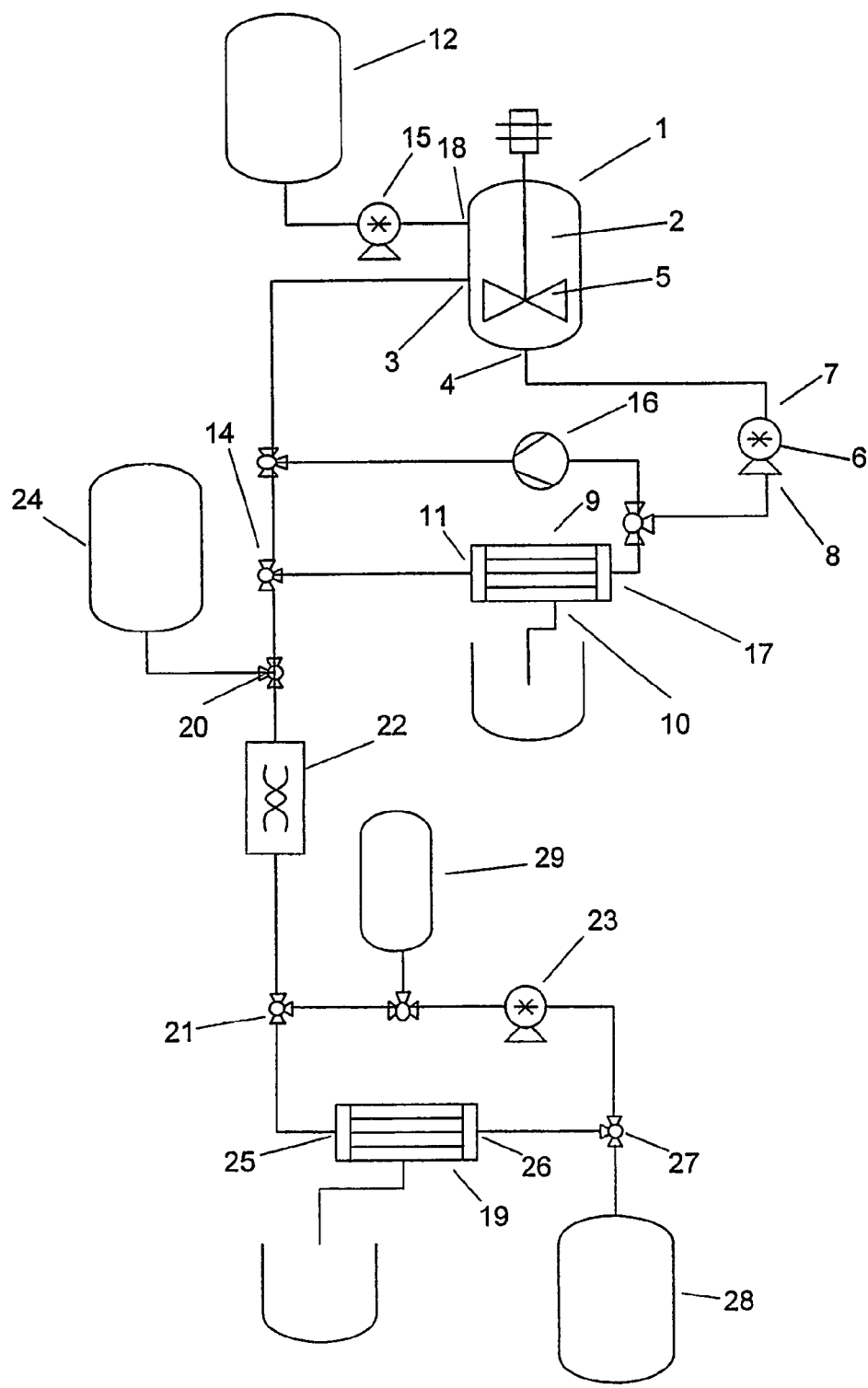
FIG. 4: Schematic representation of a device to prepare and purify microparticles comprising two closed loop assemblies.

The invention claimed is:

1. A method for the preparation of purified microparticles, comprising the steps of:
    (a) providing a liquid medium containing a dispersed precursor material which is capable of forming microparticles;
    (b) forming microparticles from the precursor material; and
    (c) purifying the microparticles formed in step (b) by filtration in closed circuit processing under aseptic conditions, such that the microparticles are retained in a retentate,
    wherein step (b) and step (c) are conducted consecutively in a single apparatus and the microparticles formed in step (b) are transferred through a closed conduit system using closed circuit processing under aseptic conditions of the apparatus to a filtration unit wherein step (c) takes place, and wherein said microparticles are recovered from the filtration unit.

2. The method of claim 1, wherein step (c) is carried out by tangential flow filtration.

3. The method of claim 1, wherein step (c) is performed as a continuous process.

4. The method of claim 1, wherein at least one of steps a-c is conducted under a substantially oxygen-free atmosphere.

5. The method of claim 4, wherein at least one of steps a-c is conducted under an inert gas atmosphere.

6. The method of claim 1, wherein the liquid medium is an emulsion or a suspension.

7. The method of claim 1, wherein step (b) comprises crosslinking or polymerization.

8. The method of claim 7, wherein the crosslinking or polymerization is initiated by a radical polymerization initiator.

9. The method of claim 1, wherein step (b) comprises physical solidification of the precursor material by at least one of precipitation, complexation, phase separation, coacervation, complex coacervation, salting-out, solvent evaporation, solvent removal, solvent extraction, or congealing.

10. The method of claim 1, wherein step (b) is performed while the liquid medium is agitated.

11. The method of claim 1, wherein the retentate, including the microparticles, is recovered.

12. The method of claim 11, further comprising contacting the retentate with an active compound under conditions which allow an uptake of the active compound by the microparticles.

13. The method of claim 11, wherein the retentate is subjected to a drying or freeze drying step.

14. The method of claim 1, further comprising a homogenization step.

15. The method of claim 1, wherein the microparticles prepared are microparticles selected from the group consisting of microspheres, microcapsules, liposomes, lipoplexes, lipid complexes, lipospheres, nanoparticles, nanospheres, and nanocapsules.

16. The method of claim 1, wherein microparticles are prepared having weight average diameter from about 10 nm to about 500 µm.

17. The method of claim 1, wherein the liquid medium is an aqueous liquid.

18. The method of claim 1, wherein the liquid medium comprises one or more solutes selected from the group comprising mineral salts, organic salts, sugars, sugar alcohols, acids, amino acids, polymers, pigments, colorants, buffers, solvents, cosolvents, lyoprotectants, surfactants, thickeners, lipids, stabilizers, antioxidants, and preservatives.

19. The method of claim 1, wherein the precursor material comprises a lipoidal material.

20. The method of claim 1, wherein the precursor material comprises a polymeric material.

21. The method of claim 20, wherein the polymeric material comprises at least one crosslinkable polymer.

22. The method of claim 21, wherein the at least one crosslinkable polymer is a dextran or a dextran derivative.

23. The method of claim 1, wherein the liquid medium comprises an active compound.

24. The method of claim 23, wherein the active compound is selected from a group comprising peptides, modified peptides, proteins, hormones, antigens, polysaccharides, nucleic acids, and functional analogues of the peptides, modified peptides, proteins, hormones, antigens, polysaccharides and nucleic acids.

25. The method of claim 23, wherein the active compound is a drug or a diagnostic agent.

26. The method of claim 23, wherein the liquid medium comprises two or more active compounds.

27. A pharmaceutical kit comprising a package with at least two sealed compartments, wherein a first sealed compartment contains a dry solid composition which comprises the microspheres prepared by the method of claim 1, and wherein a second sealed compartment contains a liquid for dissolving or dispersing the dry solid composition to obtain a microparticle dispersion.

28. A device for the preparation and purification of microparticles, said device comprising one or a plurality of processing units, said processing unit comprising a processing loop including:
 (a) a loop inlet
 (b) a processing vessel with an agitator,
 (c) a pump; and
 (d) a tangential flow filtration unit having an inlet and a retentate outlet arranged in the loop and a filtrate outlet forming an outlet for the loop, and an alternative retentate outlet for harvesting the retentate,
 and in which device any plurality of processing units are arranged in cascade, such that the outlet of an upstream processing unit is connected to the inlet of a subsequent downstream processing unit, or in which for one processing unit the filtrate outlet is connected to the loop inlet.

29. The device of claim 28, wherein the processing loop of at least one processing unit comprises one or more additional inlets and/or outlets for solid, liquid, and gaseous materials.

30. The device of claim 28, wherein the processing loop is aseptically sealed from the air surrounding the device.

31. The device of claim 28, wherein the vessel comprises a thermostated heater/cooler for controlling the temperature of liquid being processed in the processing loop.

32. The device of claim 28, wherein the processing vessel has an interior chamber with a volume of at least 10 liters.

33. The device of claim 28, wherein the filtration unit comprises a disposable filtration cartridge or a disposable dialysis cartridge.

34. The device of claim 28, wherein the filtration unit comprises at least one filtration device selected from a group consisting of a hollow fiber filter, a capillary filter, a hollow fiber dialyzer, a capillary dialyzer, and an artificial kidney.

35. The device of claim 28, further comprising one or more processing units selected from the group of mixing units, heating units, cooling units, thermostats, pressurizing units, valves, pumps, vacuum pumps, filtration units, storage tanks, homogenizes, and control units.

36. The device of claim 35, comprising one or more static mixers.

37. The device of claim 35, comprising at least two filtration units capable of tangential flow filtration.

38. The device of claim 34, comprising more than one closed loop, and wherein each closed loop comprises a filtration unit capable of tangential flow filtration.

39. The method of claim 5, wherein the inert gas is nitrogen or a noble gas.

40. The method of claim 10, wherein step (b) is performed while the liquid medium is stirred.

41. The method of claim 12, wherein the retentate is subjected to a drying or freeze drying step.

42. The method of claim 14, wherein the homogenization step is a high pressure homogenization step.

43. The method of claim 16, wherein the weight average diameter is from about 50 nm to about 100 μm.

44. The device of claim 29, wherein the processing loop is aseptically sealed from the air surrounding the device.

45. The device of claim 36, comprising at least two filtration units capable of tangential flow filtration.

46. The device of claim 28 which comprises only one processing unit.

* * * * *